A. S. DYCKMAN.
Fruit-Protectors.
No. 157,199. Patented Nov. 24, 1874.
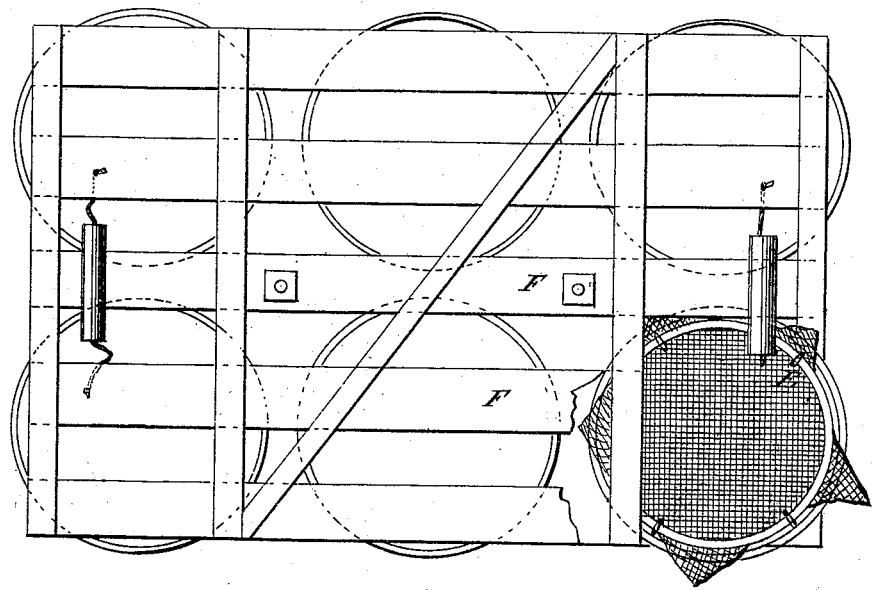
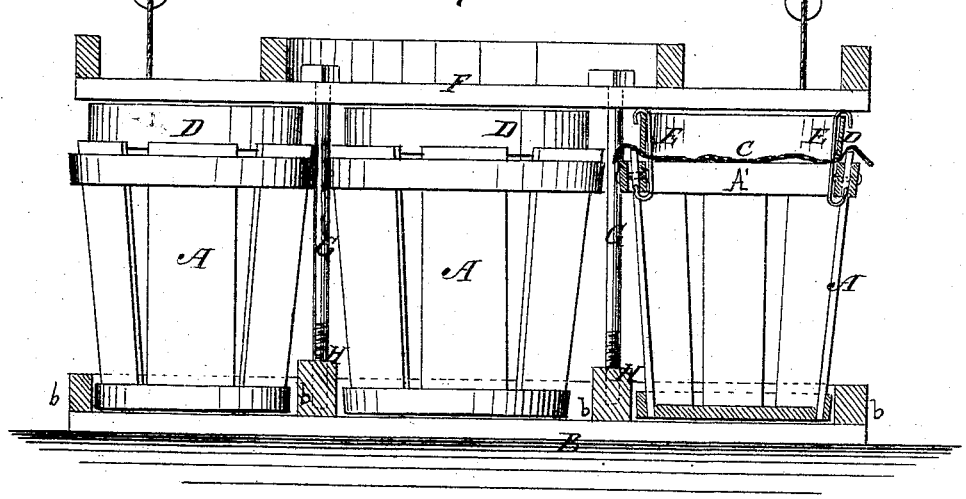

UNITED STATES PATENT OFFICE.

AARON S. DYCKMAN, OF SOUTH HAVEN, MICHIGAN.

IMPROVEMENT IN FRUIT-PROTECTORS.

Specification forming part of Letters Patent No. 157,199, dated November 24, 1874; application filed February 21, 1874.

*To all whom it may concern:*

Be it known that I, AARON S. DYCKMAN, of South Haven, in the county of Van Buren and State of Michigan, have invented a new and Improved Fruit-Protector, of which the following is a specification:

The invention will first be fully described, and then pointed out in the claim.

Figure 1 is a plan view, and Fig. 2 a sectional elevation.

A represents a fruit-basket, having the upper hoop in two parts, connected by a rivet passing through the staves. B is preferably a slatted platform, on which is supported, between its cross-pieces b b, rows of baskets. F is an upper platform, which rests upon cap-hoops D, that hold a wire-gauze cover over the peaches, the two platforms being clamped upon the baskets and caps by end-threaded rods G, working in a nut, H, formed in the cross piece b.

The peaches are heaped in the baskets, the wire-gauze C placed over them, the cap-hoop D placed over the wire-gauze so as to rest on the inner part of hoop A', and the double hooks E made to catch between the two parts of hoop A' and over the cap D. The baskets are then placed on platform B, the top platform F placed on the caps D, and the screws G turned until all the baskets are held tight.

When the baskets with their contents have been transported and sold, the screws are removed and laid between the two platforms, the whole occupying so small a space that the railroads charge nothing for their return.

By putting four to six baskets in my crate, they are readily manipulated, saving more than half the usual labor, while they have a free circulation of air. The fruit is visible, and yet it cannot be purloined.

What I claim is—

A detachable fruit-crate consisting of upper and lower platforms F B, screw-bolts G, and nuts H, as shown and described, for the purpose specified.

AARON S. DYCKMAN.

Witnesses:
C. J. MONROE,
A. B. CHASE.